United States Patent Office 3,590,034
Patented June 29, 1971

3,590,034
AMIDES DERIVED FROM PIPERAZINE-1-ACETIC ACID AND ESTERS THEREOF AND PROCESS FOR OBTAINING SAME
Claude Fauran, Paris, Gerard Huguet, Malesherbes, Guy Raynaud, Paris, Bernard Pourrias, Meudon, and Michel Turin, Paris, France, assignors to Delalande S.A. Courbevoie, Hauts-de-Seine, France
No Drawing. Filed Sept. 20, 1968, Ser. No. 761,325
Claims priority, application Great Britain, Sept. 29, 1967, 44,435/67
Int. Cl. C07d 51/70
U.S. Cl. 260—240                 9 Claims

ABSTRACT OF THE DISCLOSURE

Compounds of the formula:

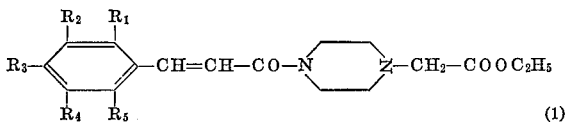

(1)

in which $R_1$, $R_2$, $R_3$, $R_4$ and $R_5$, which may be the same or different, each represent a hydrogen atom, a halogen atom (F, Cl, Br), an alkyl radical having one to five carbon atoms, a lower alkoxy radical, a methylenedioxy group and R represents a saturated or unsaturated, straight or branched-chain, alkyl radical having one to six carbon atoms and a process for preparing same which involves reacting an ester of 1-piperazine acetic acid with a halogenated cinnamoyl in the presence of an alkaline agent. The compounds have a coronaro-dilatory action, a hypotensive action, an antiangiotensin activity, a vasodilatory activity, an antiarythmic activity and/or a diuretic action.

The present invention relates to new industrial compounds having a therapeutic activity which are amide derivatives of 1-piperazine acetic acid corresponding to the general formula:

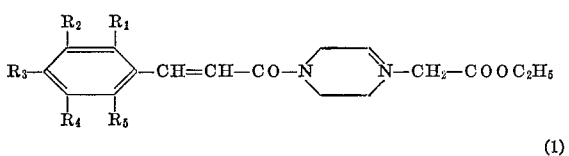

(1)

in which $R_1$, $R_2$, $R_3$, $R_4$ and $R_5$, which may be the same or different, each represent a hydrogen atom, a halogen atom (F, Cl, Br), an alkyl radical having 1 to 5 carbon atoms, a lower alkoxy radical or a methylenedioxy group.

The present invention also concerns the nontoxic acid addition salts which may be obtained from the derivatives of Formula 1 and also to the method of preparation of these derivatives and the salts thereof.

According to the invention the method of preparation of the derivatives of Formula 1 is characterised in that an ester of 1-piperazine acetic acid of the general formula:

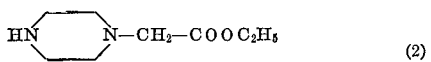

(2)

is reacted with an acid halide of the general formula:

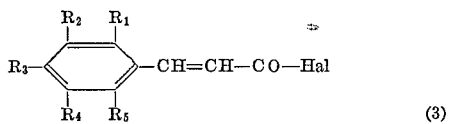

(3)

wherein $R_1$, $R_2$, $R_3$, $R_4$ and $R_5$ have the above mentioned significance and Hal represents a halogen atom.

The reaction is carried out in the presence of an alkaline agent, such as sodium carbonate, soda or pyridine, which is capable of combining with the hydracid formed in the course of the reaction, and preferably in the presence of an organic solvent such as benzene and at a temperature between ambient temperature and the boiling point of the reaction medium.

The desired derivative is isolated and recovered by the conventional means such as evaporation of the solvent, distillation or recrystallisation.

The preparation of the salts of the derivatives of Formula 1 is carried out by the action of a mineral or organic acid on the base according to the known methods of salification.

The invention will be further illustrated by means of the following non-limitative examples.

EXAMPLE 1

4-(cinnamoyl)-1-(ethoxy carbonyl methyl)-piperazine hydrochloride 0.2 mol of the ethyl ester of 1-piperazine acetic acid and 0.24 mol of pyridine are introduced into 500 ml. of anhydrous benzene. A benzene solution of cinnamic acid chloride (0.2 mol) is added thereto. After 4 hours contact in the cold, 250 ml. of water is added, and soda is added until the reaction mixture is just alkaline. The benzene phase is evaporated and a thick oil is obtained which, when dissolved in ethanol and treated with hydrochloric acid, gives a well-crystallised hydrochloride. M.P.=198° C.

EXAMPLE 2

4-(4'-methoxy-cinnamoyl)-1-(ethoxy carbonyl methyl) piperazine hydrochloride

To a mixture of pyridine (0.36 mol) and 1-piperazino ethyl acetate (0.3 mol) in benzene there is added a solution of 4-methoxy cinnamoyl chloride in the same solvent. The temperature of the mixture rises rapidly and a precipitate in excellent yield is formed. After heating under reflux for 2 hours, 450 ml. of water and soda are added. The benzene phase is treated directly with hydrochloric acid and a hydrochloride is obtained which is recrystallised from absolute ethanol. M.P.=190° C.

EXAMPLE 3

4-(3',4'-dimethoxy-cinnamoyl)-1-(ethoxycarbonyl methyl) piperazine hydrochloride 3,4-dimethoxy-cinnamoyl chloride is added to a benzene solution of 1-piperazino ethyl acetate and pyridine. After 3 hours under reflux and treatment with water and soda, a viscous oil is obtained which is converted into the hydrochloride by the addition of hydrochloric acid. M.P.=200° C. with decomposition.

EXAMPLE 4

4-(3',4',5'-trimethoxy-cinnamoyl)-1-(ethoxycarbonyl methyl) piperazine, its hydrochloride and its acid maleate A solution of 1-piperazino ethyl acetate (0.2 mol) in benzene (300 ml.) is treated with 3,4,5-trimethoxy cinnamoyl chloride (0.2 mol) in the presence of sodium bicarbonate (0.3 mol). After contacting for one hour at room temperature, the mixture is refluxed for a further hour. The benzene solution is then treated with an aqueous solution of sodium bicarbonate. After evaporation of the solvent, a solid product is obtained which is recrystallised from iso-propyl ether. M.P.=96° C. This base, when treated with hydrochloric acid, gives a hydrochloride having a melting point of 200° C. with decomposition. By the action of maleic acid the acid maleate is obtained, having a melting point of 130° C.

EXAMPLE 5

4-(3',4'-methylene-dioxy cinnamoyl)-1-(ethoxy carbonyl methyl) piperazine hydrochloride 1-piperazino ethyl acetate (0.2 mol) and pyridine (0.24 mol) in anhydrous benzene (400 ml.) are treated with solid 3,4-methylene-dioxy cinnamoyl chloride. After two hours of heating under reflux, the solution is taken up in water, the benzene is removed and the oily residue is treated with hydrochloric acid. The hydrochloride obtained is recrystallised from 96° ethanol and has a melting point of 195° C.

EXAMPLE 6

4-(4'-chloro cinnamoyl)-1-(ethoxy carbonyl methyl) piperazine hydrochloride

A solution of 1-piperazino ethyl acetate (0.1 mol) in anhydrous ether (100 ml.) is treated, in the presence of sodium bicarbonate (0.35 mol), with 4-chloro-cinnamoyl chloride (0.12 mol) in an anhydrous ether solution. After three hours of contact, with stirring, at room temperature, the mixture is treated with water (500 ml.) in an alkaline medium. The product obtained after concentration of the ethereal solution is treated with gaseous hydrochloric acid, and gives a hydrochloride which is recrystallised from 96° ethanol. M.P.=210° C. with decomposition.

EXAMPLE 7

4-(2',4'-dichloro-cinnamoyl)-1-(ethoxy carbonyl methyl) piperazine hydrochloride This compound is obtained from 2,4-dichloro-cinnamoyl chloride, according to the technique described in Example 6. M.P.=190° C.

EXAMPLE 8

4-(4'-fluoro-cinnamoyl)-1-(ethoxy carbonyl methyl) piperazine hydrochloride

This compound is obtained by using 4-fluoro cinnamoyl chloride according to the technique described in Example 6. M.P.=205° C. with decomposition.

The compounds according to the invention have been studied on animals in laboratories and have shown in particular:

Coronaro-dilatory properties as shown by the measurement of the coronary veinous sinous rate in dogs. The administration of the compounds according to the invention must be by intravenous means as intraduodenal means causes a coronary dilatation and a diminution of the coronary resistance which accompanies a diminution of the myocardiac consumption of oxygen;

Hypotensive properties evidenced in dogs, cats, rabbits, and rats which must be by intravenous means either by injection or perfusion, as well as by oral or intraduodenal means. The lowering of the arterial pressure appears principally in the level of the diastolic pressure. By virtue of the very good intestinal re-absorption of the compounds according to the invention, the necessary oral doses to obtain the effect are not very much greater than the active doses given intravenously.

There is also observed a reduction of the hypertensive effects of the angiotensin administered in rats by intravenous perfusion, the products being administered preventatively by oral means. This effect manifests itself from ½₀ the DL 50.

Vasodilatatory properties evidenced by the study of peripheral vasomotricity by measurement of the femoral arterial rate at constant pressure in dogs and rabbits.

The intra-arterial administration of the compounds in accordance with the invention causes an increase of the rate revealing a peripheral vasodilatation.

Diuretic properties which manifest themselves by an increase in the urinary elimination of water and of the ions of chlorine and sodium. This in fact has been particularly studied in rats.

The antiarythmic properties which are themselves revealed by the disappearance of extrasystoles caused by the administration of a cardio-toxic substance such as barium chloride.

Sedative properties observed following the administration of a cardio-toxic substance such as barium chloride.

Sedative properties observed following the administration of the substances of the invention. The revealing of this effect has been done in mice by an actimetric method using a cage with light beams and photoelectric cells, by the evasion test on an inclined plane, and by the study of the aggressiveness caused by electric stimulation. By way of example certain results obtained amongst these with two of the compounds according to the invention are shown below;

4-(3',4',5'-trimethoxy cinnamoyl)-1-(ethoxy carbonyl methyl) piperazine hydrochloride

ACUTE TOXICITY IN MICE

Mg./kg.
DL 50 by intravenous means _____ 300
By oral means _____ 1300

Coronaro-dilatory action (intravenously)—

At 15 mg./kg.: An increase of the coronary venous sinus rate of 50 percent, a diminution of the myocardiac consumption of oxygen of 20 percent, duration of these two effects=15 minutes At 25 mg./kg.: An increase in the coronary venous sinus rate of 70 percent, decrease of the myocardiac consumption of oxygen of 30 percent, duration of these two effects=30 minutes.

Hypotensive action (given intravenously)—

In the cat

At 20 mg./kg. Lessening of the average arterial pressure of 30 percent during a time greater than or equal to 10 minutes.

In the dog

At 15 mg./kg.: Lessening of the average arterial pressure of 16 percent during a time of 15 minutes.

At 20 mg./kg.: Lessening of the average arterial pressure of 50 percent during a time greater than or equal to 20 minutes.

Given intraduodenally—

In the dog

At 25 mg./kg.: Lowering of the average arterial pressure by 60% during a time greater than or equal to one hour.

VASODILATORY ACTIVITY—GIVEN

At 75 mg./kg.: Lowering of the hypertensive activity of the angiotensin of 35%.

VASODILATORY ACTIVITY—GIVEN INTRA-ARTERIALLY

In the rabbit

At 250 μg./kg.: Increase of the femoral rate of 100%.

In the dog

At 125 Ug./kg.: Increase of the femoral rate of 50%.

ANTIARYTHMIC ACTIVITY—GIVEN INTRAVENOUSLY

In the rabbit

At 25 mg./kg.: Suppression of the extrasystoles caused by the administration of barium chloride.

SEDATIVE ACTIVITY—GIVEN ORALLY IN MICE

Actimetric: DE 50% hypomotivity=230 mg./kg.
Evasion test on an inclined plane: DE 50% hypomotivity=180 mg./kg.
Inhibition of the aggressiveness caused by electric stimulation: DE 50%=145 mg./kg.
4-(2',4'-dichloro-cinnamoyl) 1-(ethoxy carbonyl methyl) piperazine hydrochloride.

ACUTE TOXICITY IN MICE

|  | Mg./kg. |
|---|---|
| DL 50 (given intravenously) | 130 |
| DL 50 (given orally) | 450 |

DIURETIC ACTION—GIVEN ORALLY

In the rat

At 20 mg./kg.: Increase in six hours of the elimination of—

Water by 60%
Chloride by 25%
Sodium by 40%

Potassium remains constant. The compounds according to the invention can be utilised therapeutically according to the following forms.

Tablets of 100 mg.—1 to 3 per day
Delayed release tablets of 300 mg.—1 per day
Injectable solutions of 100 mg. (2 ml. ampoules)—1 to 2 ampoules per day given intravenously or intramuscularly.

The different solid or liquid pharmaceutical forms, intended to be administered to man by oral, rectal, or parenteral means, such as ordinary or sugar-coated tablets, capsules, enteric or delayed release capsules, drinkable or injectable solutions or suppositories containing the aforementioned compounds as the principal active agent, are obtained according to the art together with the usual excipients; e.g., starch, talc, stearates, lactose, resins, polyoxyethylene glycols, gelatine, aqueous or oily carriers, naturally occurring or synthetic excipients for suppositories, emulsifiers, adjuvants, preservatives and assorted aromatics.

What we claim is:
1. A compound of the formula:

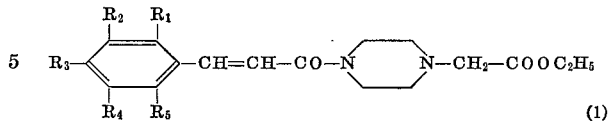

(1)

in which $R_1$, $R_2$, $R_3$, $R_4$ and $R_5$, which may be the same or different, each is selected from the group consisting of H, F, Cl, Br, an alkyl radical having one to five carbon atoms, a lower alkoxy radical and a methylenedioxy group, and nontoxic acid addition salts thereof.

2. A compound according to claim 1, in which each of $R_1$–$R_5$ is hydrogen.

3. A compound according to claim 1, in which each of $R_1$–$R_3$ and $R_5$ is hydrogen and $R_4$ is methoxy.

4. A compound according to claim 1, in which each of $R_1$, $R_2$ and $R_5$ is hydrogen, and $R_3$ and $R_4$ are methoxy.

5. A compound according to claim 1, in which $R_1$ and $R_2$ are hydrogen and $R_3$, $R_4$ and $R_5$ are methoxy.

6. A compound according to claim 1, in which each of $R_1$, $R_2$ and $R_5$ is hydrogen, and $R_3$ and $R_4$ together form a methylene dioxy group.

7. A compound according to claim 1, in which each of $R_1$–$R_3$ and $R_5$ is hydrogen and $R_4$ is chloro.

8. A compound according to claim 1, in which each of $R_1$, $R_3$ and $R_5$ is hydrogen, and $R_2$ and $R_4$ are chloro.

9. A compound according to claim 1, in which each of $R_1$–$R_3$ and $R_5$ is hydrogen and $R_4$ is fluoro.

References Cited

UNITED STATES PATENTS 2,882,271    4/1959    Janssen _____ 260—240

OTHER REFERENCES

Chemical Abstracts I, vol. 54, col. 2379 (1960) (abstract of British Patent 809,760).

Chemical Abstracts II, vol. 59, col. 13982 (1963) (abstracts of Cheng et al.

Chemical Abstracts III, vol. 59, subject index page 1833 s (1963).

JOHN D. RANDOLPH, Primary Examiner

U.S. Cl. X.R.

424—250

UNITED STATES PATENT OFFICE
CERTIFICATE OF CORRECTION

Patent No. 3 590 034                    Dated June 29, 1971

Inventor(s) Claude Fauran et al

It is certified that error appears in the above-identified patent and that said Letters Patent are hereby corrected as shown below:

Column 1, line 20; The formula is corrected to read

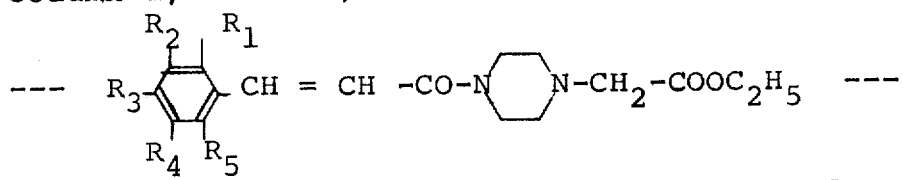

Column 1, line 45; The formula is corrected to read

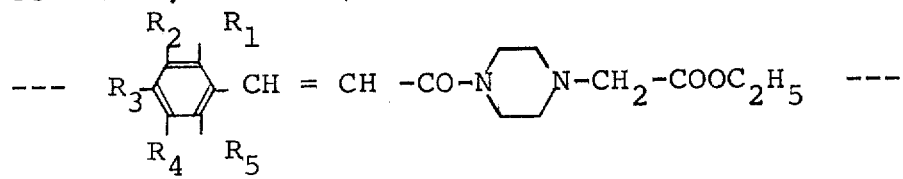

Column 6, line 16; This entire line is corrected to read
--- of $R_1$, $R_2$, $R_4$ and $R_5$ is hydrogen and $R_3$ is methoxy.---
line 20; This entire line is corrected to read
--- $R_5$ are hydrogen and $R_3$, $R_4$ and $R_2$ are methoxy. ---
line 25; This entire line is corrected to read
--- $R_1$, $R_2$, $R_4$ and $R_5$ is hydrogen and $R_3$ is chloro. ---
line 27; This entire line is corrected to read
--- $R_2$, $R_4$ and $R_5$ is hydrogen and $R_1$ and $R_3$ are chloro. ---
line 29; This entire line is corrected to read
--- $R_1$, $R_2$, $R_4$ and $R_5$ is hydrogen and $R_3$ is fluoro.

Signed and sealed this 3rd day of October 1972.

(SEAL)
Attest:

EDWARD M. FLETCHER, JR.                    ROBERT GOTTSCHALK
Attesting Officer                          Commissioner of Patents